(12) United States Patent
Ashizuka

(10) Patent No.: US 8,423,748 B2
(45) Date of Patent: Apr. 16, 2013

(54) REGISTER CONTROL CIRCUIT AND REGISTER CONTROL METHOD

(75) Inventor: Yuusuke Ashizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 12/509,737

(22) Filed: Jul. 27, 2009

(65) Prior Publication Data
US 2010/0030977 A1 Feb. 4, 2010

(30) Foreign Application Priority Data

Jul. 30, 2008 (JP) ................................. 2008-196793

(51) Int. Cl.
*G06F 12/00* (2006.01)
(52) U.S. Cl.
USPC ............ 711/220; 712/221; 712/223; 712/226
(58) Field of Classification Search .................. 711/220; 712/221, 223, 226
See application file for complete search history.

(56) References Cited

U.S. PATENT DOCUMENTS 3,614,741 A * 10/1971 McFarland et al. ........... 711/214
2002/0013796 A1 * 1/2002 Byrne et al. ................... 708/200
2005/0273546 A1 * 12/2005 Tsujimura ...................... 711/101
2009/0083522 A1 * 3/2009 Boggs et al. .................. 712/220

FOREIGN PATENT DOCUMENTS

| JP | 61-264431 | 11/1986 |
| JP | 2001-184853 | 7/2001 |
| JP | 2004-046483 | 2/2004 |

OTHER PUBLICATIONS

Japanese Office Action for application No. 2008-196793 issued Dec. 25, 2012.

* cited by examiner

*Primary Examiner* — Jared Rutz
*Assistant Examiner* — Gurtej Bansal
(74) *Attorney, Agent, or Firm* — Staas & Halsey LLP

(57) ABSTRACT

A register control circuit that controls a register specified by an inputted address includes a signal output that outputs a first control signal and a second control signal based on the inputted address, a selector that selects data of a register specified by the first control signal outputted from the signal output, a logical operator that performs a logical operation of write data outputted from a processor and the data selected by the selector to output an operation result, and a storage that stores data in the register specified by the first control signal by selecting one of the write data and the operation results as the data based on the second control signal outputted from the signal output.

11 Claims, 5 Drawing Sheets

FIG. 4

| Address | Register | Group |
|---|---|---|
| 0x1000 | REGISTER | 105 |
| 0x1004 | AND OPERATION REGISTER | |
| 0x1008 | OR OPERATION REGISTER | |
| 0x100C | NAND OPERATION REGISTER | |
| 0x1010 | NOR OPERATION REGISTER | |
| 0x1014 | ExOR OPERATION REGISTER | |
| 0x1018 | ExNOR OPERATION REGISTER | |
| 0x1100 | REGISTER | 106 |
| 0x1104 | AND OPERATION REGISTER | |
| 0x1108 | OR OPERATION REGISTER | |
| 0x110C | NAND OPERATION REGISTER | |
| 0x1110 | NOR OPERATION REGISTER | |
| 0x1114 | ExOR OPERATION REGISTER | |
| 0x1118 | ExNOR OPERATION REGISTER | |
| 0x1200 | REGISTER | 107 |
| 0x1204 | AND OPERATION REGISTER | |
| 0x1208 | OR OPERATION REGISTER | |
| 0x120C | NAND OPERATION REGISTER | |
| 0x1210 | NOR OPERATION REGISTER | |
| 0x1214 | ExOR OPERATION REGISTER | |
| 0x1218 | ExNOR OPERATION REGISTER | |
| 0x1300 | REGISTER | 108 |
| 0x1304 | AND OPERATION REGISTER | |
| 0x1308 | OR OPERATION REGISTER | |
| 0x130C | NAND OPERATION REGISTER | |
| 0x1310 | NOR OPERATION REGISTER | |
| 0x1314 | ExOR OPERATION REGISTER | |
| 0x1318 | ExNOR OPERATION REGISTER | |

REGISTER CONTROL CIRCUIT AND REGISTER CONTROL METHOD

CROSS-REFERENCE TO RELATED APPLICATIONS

This application is based upon and claims the benefit of priority of the prior Japanese Patent Application No. 2008-196793, filed on Jul. 30, 2008, the entire contents of which are incorporated herein by reference.

FIELD

An embodiment discussed herein relates to a register control circuit that controls a register specified by an address and a register control method.

BACKGROUND

Some types of electronic equipment exercise operation control of an input/output device by changing the value of a register of the input/output device with a CPU (Central Processing Unit). To change the value of a register, the CPU normally needs an operation of three steps. The three steps are reading the value of the register, changing the read value, and writing the changed value to the register.

Further, a method of completing an operation to change the value of a register with the CPU in one step is known. According to the method, some bits of write data, out of a plurality of bits, are used to cause an input/output device to select one write mode from a plurality of write modes. The input/output device selects a write mode based on some bits of write data received from the CPU. The input/output device changes the value of a register based on the selected write mode and the remaining bits. Since processing performed by the CPU is accomplished in one step according to this method, the time needed to change the value of a register is reduced when compared with a method by which the CPU performs the processing in three steps.

The following is a document that discloses issues concerning the register control method:

Japanese Laid-open Patent Application No. 2004-46483

However, the method by which part of write data is used to specify the write mode has a problem in that all of the bits of write data cannot be used to change the value of a register, leading to decreased efficiency. This is because some bits of write data of the plurality of bits are used to cause the input/output device to select the write mode and only the remaining bits are used as bits to change the value of a register.

SUMMARY

According to an aspect of the invention, a register control circuit that controls a register specified by an inputted address includes a signal output that outputs a first control signal and a second control signal based on the inputted address, a selector that selects data of a register specified by the first control signal outputted from the signal output, a logical operator that performs a logical operation of write data outputted from a processor and the data selected by the selector to output an operation result, and a storage that stores data in the register specified by the first control signal by selecting one of the write data and the operation results as the data based on the second control signal outputted from the signal output.

The above-described embodiments of the present invention are intended as examples, and all embodiments of the present invention are not limited to including the features described above.

BRIEF DESCRIPTION OF THE DRAWINGS

FIG. 4 illustrates an example of addresses allocated to registers; and

DESCRIPTION OF EMBODIMENTS

Figure 1:
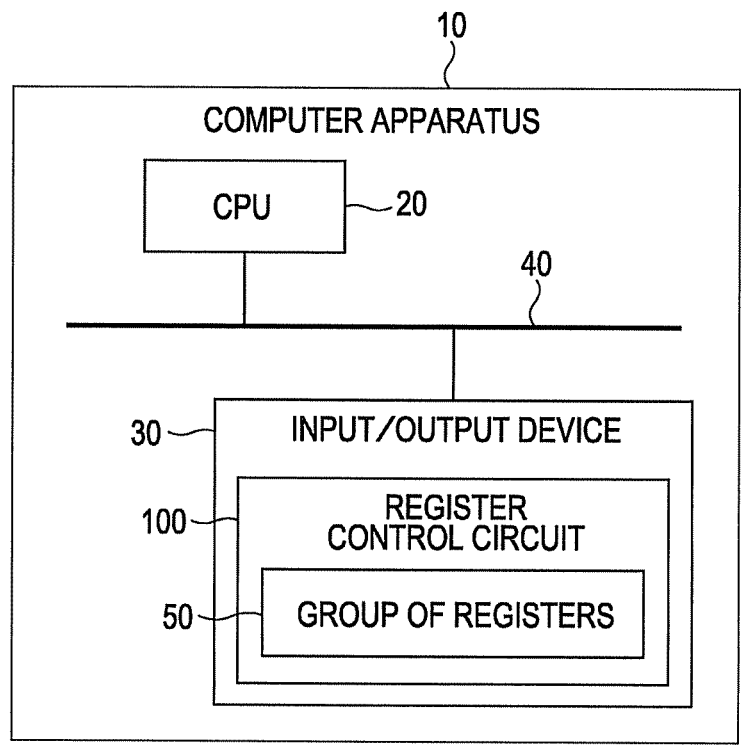
FIG. 1 illustrates a computer apparatus with a register control circuit according to an embodiment of the invention.

Reference may now be made in detail to embodiments of the present invention, examples of which are illustrated in the accompanying drawings, wherein like reference numerals refer to like elements throughout.

An embodiment of a register control circuit and register control method will be described below in detail with reference to drawings.

Figure 2:
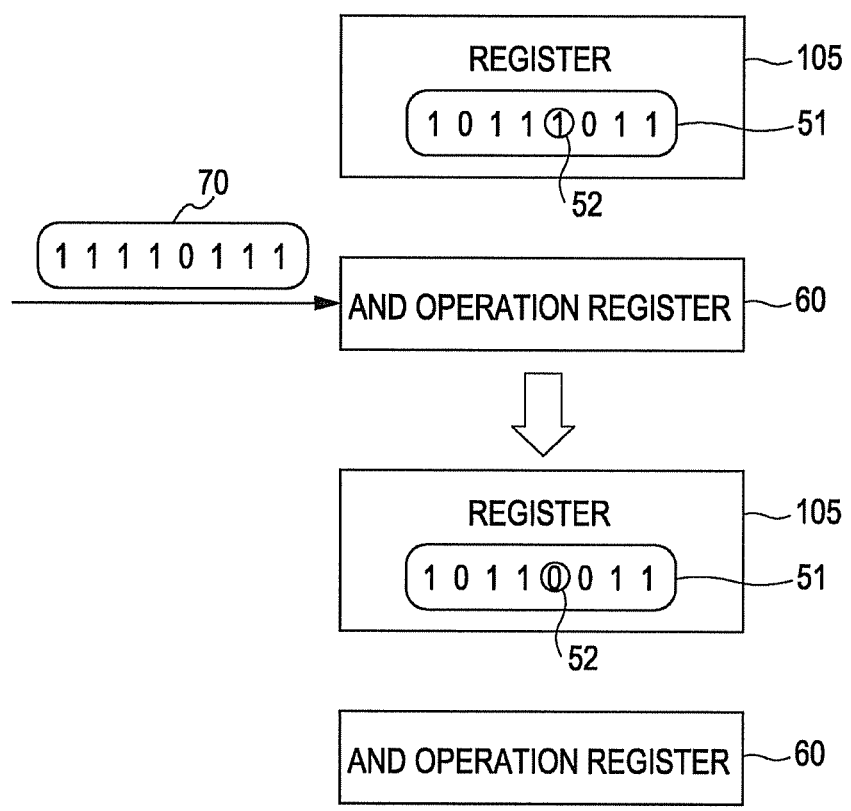
FIG. 2 illustrates a processing operation of the register control circuit according to the embodiment.

A register control circuit according to an embodiment of the invention will be provided using FIG. 1 and FIG. 2. FIG. 1 illustrates a computer apparatus implementing a register control circuit according to the present embodiment. FIG. 2 is a diagram illustrating a processing operation of the register control circuit according to the present embodiment.

As illustrated in FIG. 1, a computer apparatus 10 includes a Central Processing Unit (CPU) 20 to perform various kinds of processing, and an input/output device 30 connected by a bus 40. The input/output device 30 includes a group of registers 50. The CPU 20 exercises operation control of the input/output device 30 by changing data stored in each register of the group of registers 50. A register control circuit 100 according to the present embodiment is implemented in the input/output device 30. FIG. 1 illustrates only components related to the register control circuit 100 according to the present embodiment, but it is assumed that other components included in a normal computer apparatus are present in the computer apparatus 10 of FIG. 1.

The register control circuit 100 controls an operation of writing data to the group of registers 50 by the CPU 20. Here, it is assumed that, as illustrated in FIG. 2, a register 105, which is one of a plurality of registers shown as the group of registers 50 in FIG. 1, stores, for example, 8-bit data 51. In the example in FIG. 2, the value of the data 51 is "10111011". A processing operation of the register control circuit 100 when the CPU 20 changes the value of a fourth bit 52 from the right of the data 51 from "1" to "0" to exercise operation control of the input/output device 30 will be described as an example.

To change the value of the data 51, the CPU 20 writes 8-bit write data 70 to an AND operation register 60, which is different from the register 105. Values of each bit of the write data 70 are "11110111" in this example. The CPU 20 outputs an address to specify the AND operation register 60 and the write data 70 to the input/output device 30. In the example in FIG. 2, the AND operation register 60 is a virtual register.

When the address to specify the AND operation register 60 is received, the register control circuit 100 performs an AND operation of the write data 70 output from the CPU 20 paired with the address and temporarily stored in the AND operation register 60 and the data 51 stored in the register 105, and writes an operation result to the register 105. As a result, the value of the bit 52 of the data 51 is changed from "1" to "0" so that the data 51 is now "10110011". In this case, the CPU 20 only outputs the write data 70 to cause the input/output device 30 to change the value of the register 105 to the input/output device 30. Therefore, the CPU 20 performs the processing in only one step.

In the example in FIG. 2, all bits of the 8-bit write data 70 can be handled as bits to change the data 51 stored in the register 105 so that there is no need to use some bits of the write data 70 to allow the register control circuit 100 to select the write mode. That is, while the fourth bit 52 from the right of the data 51 is changed from "1" to "0" in the example in FIG. 2, the first bit from the right of the data 51 can be changed from "1" to "0", or the eighth bit from the right from "1" to "0", depending on the value of each bit of the write data 70 output to the input/output device 30 by the CPU 20.

Thus, according to a register control circuit in the present embodiment, when the value of a register is changed by the CPU, processing performed by the CPU can be accomplished in one step, and also all bits of write data output by the CPU can be used as bits to change the value of a register.

The register 60 is denoted as the "AND operation register" because an example assuming an AND operation as a logical operation of data stored in a register and write data is described. However, as described later, the logical operation of data stored in a register and write data is not limited to an AND operation.

Figure 3:
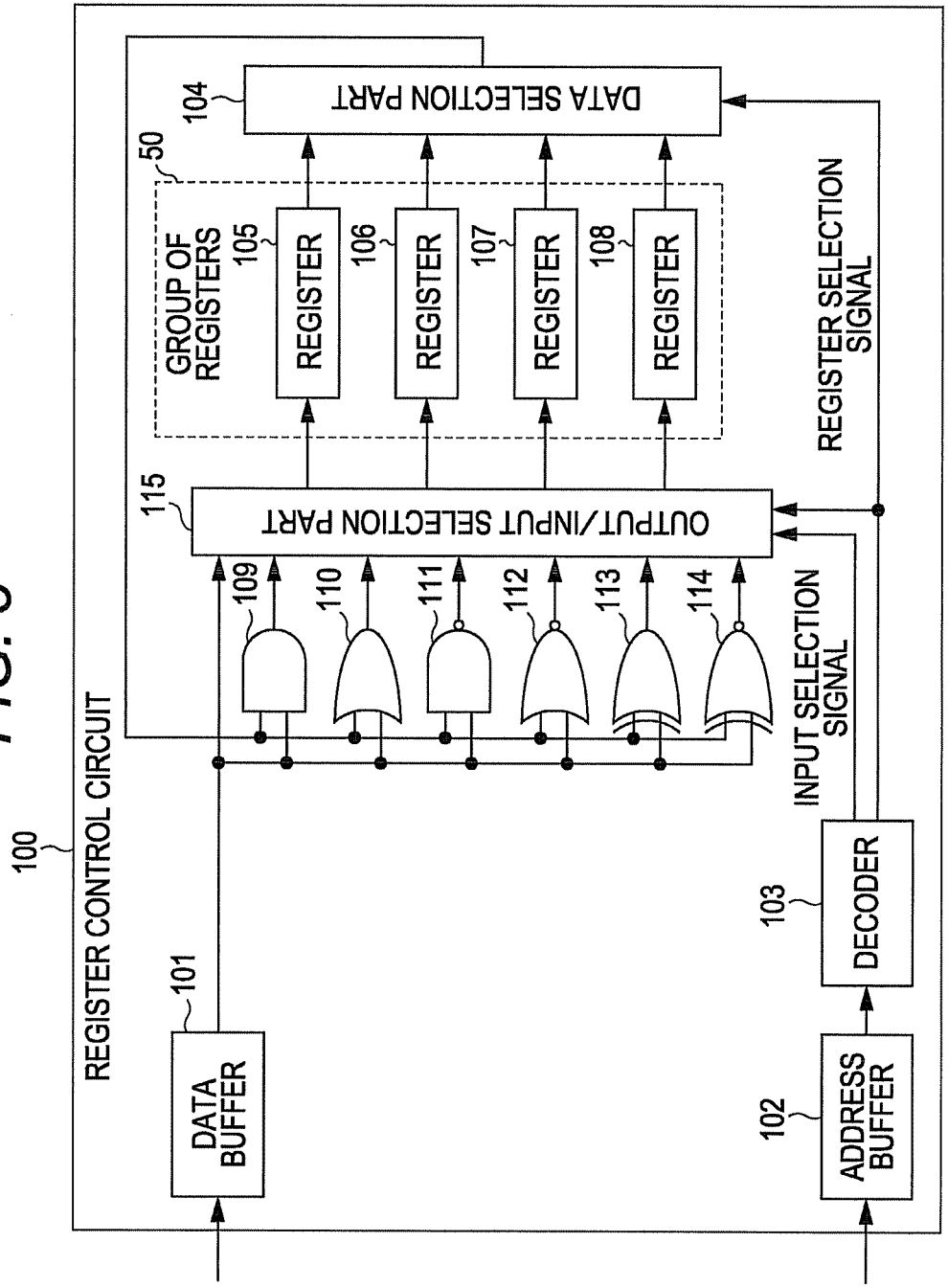
FIG. 3 illustrates a configuration of the register control circuit according to the embodiment.

Next, the configuration of the register control circuit 100 will be described. FIG. 3 illustrates the configuration of a register control circuit according to the embodiment. As illustrated in FIG. 3, the register control circuit 100 includes a data buffer 101, an address buffer 102, a decoder 103, a data selector 104, registers 105 to 108, an AND operator 109, an OR operator 110, a NAND operator 111, a NOR operator 112, an ExOR operator 113, an ExNOR operator 114, and an output/input selector 115. FIG. 3 illustrates only components related to an operation to change data in the registers 105 to 108, but other components may also be contained in the register control circuit 100.

The data buffer 101 temporarily stores write data outputted from the CPU 20. Then, the data buffer 101 outputs the temporarily stored write data to each of the AND operator 109, the OR operator 110, the NAND operator 111, the NOR operator 112, the ExOR operator 113, the ExNOR operator 114, and the output/input selector 115.

The address buffer 102 temporarily stores an address outputted from the CPU 20 illustrated in FIG. 1. Then, the address buffer 102 outputs the stored address to the decoder 103.

The decoder 103 decodes an address outputted from the address buffer 102. When an address is inputted from the address buffer 102, the decoder 103 generates an input selection signal and a register selection signal to output the input selection signal and register selection signal to the output/input selector 115. The decoder 103 also outputs the register selection signal to the data selector 104.

The input selection signal is a signal to give instructions to the output/input selector 115 to select data as an inputted signal. In the example in FIG. 3, seven types of signals are provided as input selection signals: 1) a signal to cause a selection of write data inputted from the data buffer 101 to the output/input selector 115; 2) a signal to cause a selection of an operation result inputted from the AND operator 109 to the output/input selector 115; 3) a signal to cause a selection of an operation result inputted from the OR operator 110 to the output/input selector 115; 4) a signal to cause a selection of an operation result inputted from the NAND operator 111 to the output/input selector 115; 5) a signal to cause a selection of an operation result inputted from the NOR operator 112 to the output/input selector 115; 6) a signal to cause a selection of an operation result inputted from the ExOR operator 113 to the output/input selector 115; and 7) a signal to cause a selection of an operation result inputted from the ExNOR operator 114 to the output/input selector 115.

The register selection signal is a signal to cause the output/input selector 115 to select a register to serve as a data output destination. Four types of signals are provided as register selection signals: 1) a signal to specify the register 105; 2) a signal to specify the register 106; 3) a signal to specify the register 107; and 4) a signal to specify the register 108.

When an 8-bit address is inputted, for example, the decoder 103 generates one of the seven types of input selection signals based on values of the first to fourth bits of the input address, and outputs the generated signal to the output/input selector 115. The decoder 103 also generates one of the four types of register selection signals based on values of the fifth to eighth bits of the input address, and outputs the generated signal to the output/input selector 115 and the data selector 104.

The output side of four registers, the register 105 to the register 108, is connected to the data selector 104. The data selector 104 selects data in the register specified by the register selection signal inputted from the decoder 103 and outputs the data to each of the AND operator 109, the OR operator 110, the NAND operator 111, the NOR operator 112, the ExOR operator 113, and the ExNOR operator 114.

The registers 105 to 108 temporarily store data outputted from the output/input selector 115. The registers 105 to 108 correspond to the group of registers 50 included in the input/output device 30 illustrated in FIG. 1. The input/output device 30 operates based on data stored in the registers 105 to 108. In addition to the registers 105 to 108, the input/output device 30 has virtual registers present therein. The registers 105 to 108 and virtual registers are specified by the CPU 20 using an address unique to each register.

FIG. 3 illustrates a configuration in which the register control circuit 100 includes a plurality of the registers 105 to 108, but the present invention is not limited to an example illustrated in FIG. 3. For example, a configuration in which the register control circuit 100 includes one register may be adopted.

The AND operator 109, the OR operator 110, the NAND operator 111, the NOR operator 112, the ExOR operator 113, and the ExNOR operator 114 perform a logical operation of write data inputted from the data buffer 101 and data inputted from the data selector 104, and outputs an operation result to the output/input selector 115. Logical operations performed by each operation part include, starting with the AND operator 109 to which the lowest number is attached in order, an AND operation, OR operation, NAND operation, NOR operation, ExOR operation, and ExNOR operation. Types of logical operations included in the register control circuit 100 may be different from those in the example in FIG. 3.

Thus, the register control circuit 100 performs a logical operation of reading data from the registers 105 to 108 and writing data to change the data using each operation part in place of the CPU 20 illustrated in FIG. 1. That is, the CPU 20 needs only to output data to the input/output device 30 as write data to change data stored in the registers 105 to 108. Thus, when values of the registers 105 to 108 are changed by the CPU 20, processing performed by the CPU 20 can be accomplished in one step.

FIG. 3 shows a configuration in which the register control circuit 100 includes a plurality of operators, but the present invention is not limited to an example of FIG. 3, and the number of operators is arbitrary. For example, a configuration in which the register control circuit 100 includes one operator may be adopted.

Write data from the data buffer 101 and operations result from each operation part are inputted to the output/input selector 115. An input selection signal and a register selection signal from the decoder 103 are also inputted to the output/input selector 115. Then, the output/input selector 115 stores data selected from the write data and a plurality of operation results based on the input selection signal from the decoder 103 in the register specified by the register selection signal.

If, for example, the input selection signal is a signal to cause a selection of an operation result input from the AND operator 109 and the register selection signal is a signal to specify the register 105, the output/input selector 115 stores an operation result output from the AND operator 109 in the register 105.

If the input selection signal is a signal to cause a selection of write data input from the data buffer 101 and the register selection signal is a signal to specify the register 105, the output/input selector 115 stores the write data in the register 105. While respective operations results are output from each operation part in this manner, one operation result or one piece of write data output from one of the operation parts is stored in a register by processing performed by the output/input selector 115.

Next, addresses allocated to the registers 105 to 108 and virtual registers will be described. In addition to the registers 105 to 108, the input/output device 30 includes virtual registers present therein and addresses are allocated to respective virtual registers. FIG. 4 is a diagram illustrating an example of addresses allocated to registers. As illustrated in FIG. 4, an address "0x1000" is allocated to the register 105, an address "0x1100" to the register 106, an address "0x1200" to the register 107, and an address "0x1300" to the register 108 in the input/output device 30. Then, six addresses selected as every fourth address from each address allocated to the registers 105 to 108, for example, are allocated to virtual registers, namely, the AND operation register, OR operation register, NAND operation register, NOR operation register, ExOR operation register, and ExNOR operation register.

After addresses are allocated to the registers 105 to 108 and the virtual register as described above, the value of the lower bits of an address inputted to the decoder 103 will be one of seven values indicating an output of the output/input selection part. The value of the upper bits of the address is one of four values indicating the registers 105 to 108 constituting the group of registers 50. Therefore, the decoder 103 generates an input selection signal of the seven input selection signals based on the value of the lower bits of an address input from the address buffer 102. The decoder 103 also generates a register selection signal of the four register selection signals based on the value of the upper bits of an address input from the address buffer 102.

For example, a case in which an address "0x1004" and an address "0x1104", which are addresses to specify the same AND operation register, are inputted to the decoder 103 will be described. When the address "0x1004" is inputted, the decoder 103 generates an input selection signal to cause a selection of an operation result inputted from the AND operator 109 based on the value of the lower bits of the address and a register selection signal to specify the register 105 based on the value of the upper bits of the address. When the address "0x1104" is inputted, on the other hand, the decoder 103 similarly generates an input selection signal to cause a selection of an operation result inputted from the AND operator 109 based on the value of the lower bits of the address, but a register selection signal to specify the register 106 based on the value of the upper bits of the address.

How to allocate addresses to the registers 105 to 108 and virtual registers is not limited to the above allocation. In the example in FIG. 3, seven types of data are inputted to the output/input selector 115 and there are four registers. If compatible with the register control circuit 100 shown in FIG. 3, addresses may be allocated in any way as long as the value of the lower bits of an address input to the decoder 103 is one of seven values and the value of the upper bits of an address is one of four values. For example, six addresses selected as every third address from each address allocated to the registers 105 to 108 may be allocated to virtual registers.

Types of input selection signals and register selection signals can be modified in accordance with types of data inputted to the output/input selection part and the number of registers when necessary.

Figure 5:
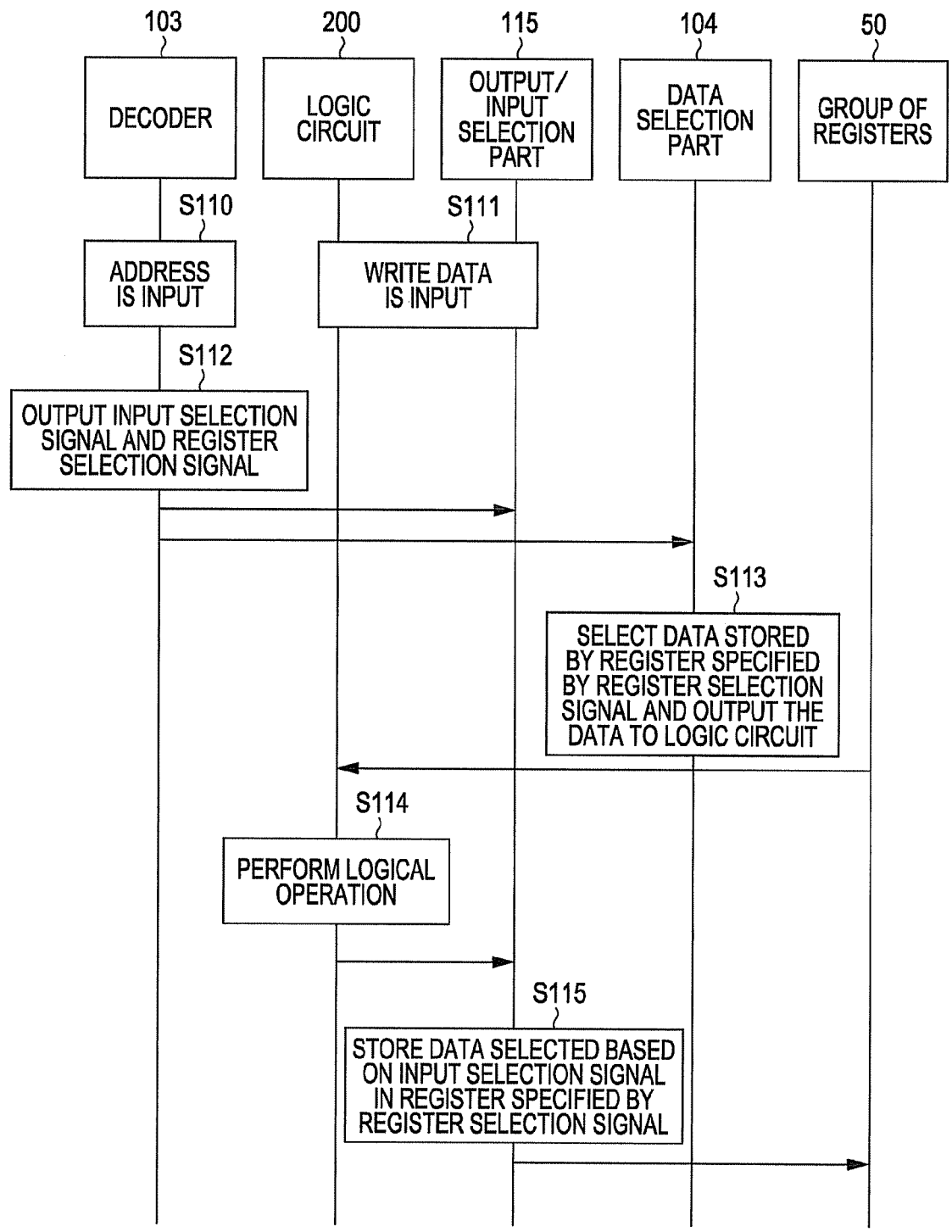
FIG. 5 illustrates a sequence diagram showing a flow of processing by a register control circuit.

Next, the flow of processing by the register control circuit 100 will be described. FIG. 5 illustrates a sequence diagram indicating the flow of processing by the register control circuit 100. In FIG. 5, the AND operator 109, the OR operator 110, the NAND operator 111, the NOR operator 112, the ExOR operator 113, and the ExNOR operator 114 illustrated in FIG. 3 are shown together as a logical circuit 200.

As shown in FIG. 5, an address is input to the decoder 103 from the address buffer 102 (S110). Also, write data is inputted to the logical circuit 200 and the output/input selector 115 from the data buffer 101 (S111). Then, the decoder 103 outputs an input selection signal and a register selection signal (S112). As a result, the input selection signal and register selection signal are inputted to the output/input selector 115 and the register selection signal is inputted to the data selector 104.

Then, the data selector 104 selects data stored by the register specified by the register selection signal in the group of registers 50 and outputs the data to the logical circuit 200 (S113). As a result, data stored in the register specified by the register selection signal is inputted to the logical circuit 200 via the data selector 104.

Then, the logical circuit 200 performs a logical operation of write data inputted from the data buffer 101 and data inputted from the data selector 104 (S114). As a result, an operation result is inputted to the output/input selector 115.

Then, the output/input selector 115 selects one of the write data and a plurality of operation results based on the input selection signal in the group of registers 50 and stores the selected data in the register specified by the register selection signal (S115). As a result, one piece of data of the write data and operation results is stored in one of the registers.

When an address and write data are inputted, as described above, the register control circuit 100 according to the present embodiment performs a logical operation of data selected based on the address of data stored in the registers 105 to 108 and the write data. Then, the register control circuit 100 selects one of the write data and a plurality of operation results based on the address and stores the selected data in a register. With such a processing operation of the register control circuit 100, the CPU 20 needs only to output an address to specify a virtual register and write data to the input/output device 30 to change a value of the registers 105 to 108. That is, processing performed by the CPU 20 can be accomplished in one step. Moreover, by containing information on how to change the value of a register depending on values of each bit of write data, all bits of the write data can be made to be bits to change the value of a register.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A register control circuit configured to receive write data and an address and to control a register based on the write data and the address, the register control circuit comprising:
   a signal output circuit configured to output a first control signal and a second control signal, based on the address;
   a first selector configured to select first data output from a register specified by the first control signal;
   a plurality of logical operators, each of the plurality of logical operators being configured to perform a different logical operation of the write data and the first data to output operation result data;
   a second selector configured to select second data from one of a plurality of the operation result data or the write data, based on the second control signal; and
   a storing circuit configured to store the second data in the register specified by the first control signal.

2. The register control circuit according to claim 1, wherein the signal output circuit generates the first control signal based on a value of a portion of bits of the received address and the second control signal based on a value of remaining bits of the received address.

3. The register control circuit according to claim 1, wherein the logical operator performs an AND operation of the write data and data selected by the selector.

4. The register control circuit according to claim 1, wherein the logical operator performs an OR operation of the write data and data selected by the selector.

5. The register control circuit according to claim 1, wherein the logical operator performs a NAND operation of the write data and data selected by the selector.

6. The register control circuit according to claim 1, wherein the logical operator performs a NOR operation of the write data and data selected by the selector.

7. The register control circuit according to claim 1, wherein the logical operator performs an ExOR operation of the write data and data selected by the selector.

8. The register control circuit according to claim 1, wherein the logical operator performs an ExNOR operation of the write data and data selected by the selector.

9. A computer apparatus comprising:
   a processor; and
   a register control circuit configured to receive write data and an address from the processor and to control a register based on the write data and the address;
   wherein the register control circuit includes:
   a plurality of registers, each of the plurality of registers storing data;
   a decoder configured to generate a first control signal and a second control signal based on the address;
   a first selector configured to select first data output from a register specified by the first control signal from among the plurality of registers;
   a plurality of logical operators, each of the plurality of logical operators being configured to perform a different logical operation of the write data received from the processor and the first data to output operation result data;
   a second selector configured to select second data from one of a plurality of the operation result data outputted by the plurality of logical operators or the write data received from the processor, based on the second control signal; and
   a storing circuit configured to store the second data in the register specified by the first control signal.

10. The computer apparatus according to claim 9, wherein each of the plurality of logical operators performs mutually different logical operations.

11. A register control method that controls a register based on an address and write data paired with the address, the method comprising:
   outputting a first control signal and a second control signal based on the address;
   selecting first data output from a register specified by the first control signal;
   performing, by a logical circuit, a plurality of logical operations of the write data outputted from a processor and the first data to output a plurality of operation result data;
   selecting second data from one of the plurality of the operation result data or the write data outputted by the processor, based on the second control signal; and
   storing the second data in the register specified by the first control signal.

* * * * *